US012214410B2

(12) United States Patent
Henda et al.

(10) Patent No.: US 12,214,410 B2
(45) Date of Patent: Feb. 4, 2025

(54) CONTAINER MEMBER SUPPLY DEVICE

(71) Applicant: Toyo Seikan Group Engineering Co., Ltd., Yokohama (JP)

(72) Inventors: Shinichiro Henda, Yokohama (JP); Kazuki Takahashi, Yokohama (JP); Kazumoto Obata, Yokohama (JP)

(73) Assignee: TOYO SEIKAN GROUP ENGINEERING CO., Ltd., Yokohama (JP)

(*) Notice: Subject to any disclaimer, the term of this patent is extended or adjusted under 35 U.S.C. 154(b) by 170 days.

(21) Appl. No.: 17/942,667

(22) Filed: Sep. 12, 2022

(65) Prior Publication Data

US 2023/0001467 A1    Jan. 5, 2023

Related U.S. Application Data

(63) Continuation of application No. PCT/JP2020/044473, filed on Nov. 30, 2020.

(30) Foreign Application Priority Data

Mar. 13, 2020  (JP) .................................. 2020-044198
Mar. 13, 2020  (JP) .................................. 2020-044199
(Continued)

(51) Int. Cl.
*B21D 43/00*   (2006.01)
*B21D 51/26*   (2006.01)
(Continued)

(52) U.S. Cl.
CPC ......... *B21D 51/32* (2013.01); *B21D 51/2692* (2013.01); *B65B 7/2807* (2013.01);
(Continued)

(58) Field of Classification Search
CPC ........ B21D 43/00; B21D 43/06; B21D 43/16; B21D 51/2653; B21D 51/2692;
(Continued)

(56) References Cited

U.S. PATENT DOCUMENTS 1,610,862 A  * 12/1926  Kronquest ............. B21D 51/32
                                                       413/27
2,659,522 A    11/1953  Ninneman et al.
(Continued)

FOREIGN PATENT DOCUMENTS

JP    62-244537 A    10/1987
JP    8-324795 A     12/1996
JP    2016-36848 A    3/2016

OTHER PUBLICATIONS

International Search Report dated Jan. 19, 2021, issued in counterpart International Application No. PCT/JP2020/044473. (3 pages).

*Primary Examiner* — Jared O Brown
(74) *Attorney, Agent, or Firm* — WHDA, LLP

(57) ABSTRACT

A container member supply device has favorable workability at a time of disassembly and washing and suppresses the occurrence of abrasion powder in a container member. A container member supply device includes: a container member separation unit that supplies a container member having a flange at a peripheral edge thereof to a pocket of a container member conveyance turret, one by one, wherein the container member separation unit has a plurality of cutout parts, and one of the plurality of cutout parts is constituted by a cutout groove that is integrally provided on an upper outer periphery of the container member conveyance turret and engages with a flange of a container member.

4 Claims, 5 Drawing Sheets

(30) Foreign Application Priority Data

Mar. 13, 2020 (JP) ................................ 2020-044200
Mar. 13, 2020 (JP) ................................ 2020-044201
Mar. 13, 2020 (JP) ................................ 2020-044202

(51) Int. Cl.
*B21D 51/32* (2006.01)
*B21D 51/44* (2006.01)
*B65B 7/28* (2006.01)
*B65G 47/84* (2006.01)

(52) U.S. Cl.
CPC ............ *B21D 43/00* (2013.01); *B21D 51/446* (2013.01); *B65G 47/84* (2013.01)

(58) Field of Classification Search
CPC .... B21D 51/32; B21D 51/446; B65B 7/2807; B65B 7/285; B65G 47/84; B65G 47/846; B65G 59/108
USPC ...................................... 413/3, 45, 47, 50, 52
See application file for complete search history.

(56) References Cited

U.S. PATENT DOCUMENTS

| | | |
|---|---|---|
| 2,906,072 A | 9/1959 | Elliott |
| 3,755,987 A | 9/1973 | Dardaine et al. |
| 5,113,636 A * | 5/1992 | Mihara ................. B65B 7/2807 53/308 |

* cited by examiner

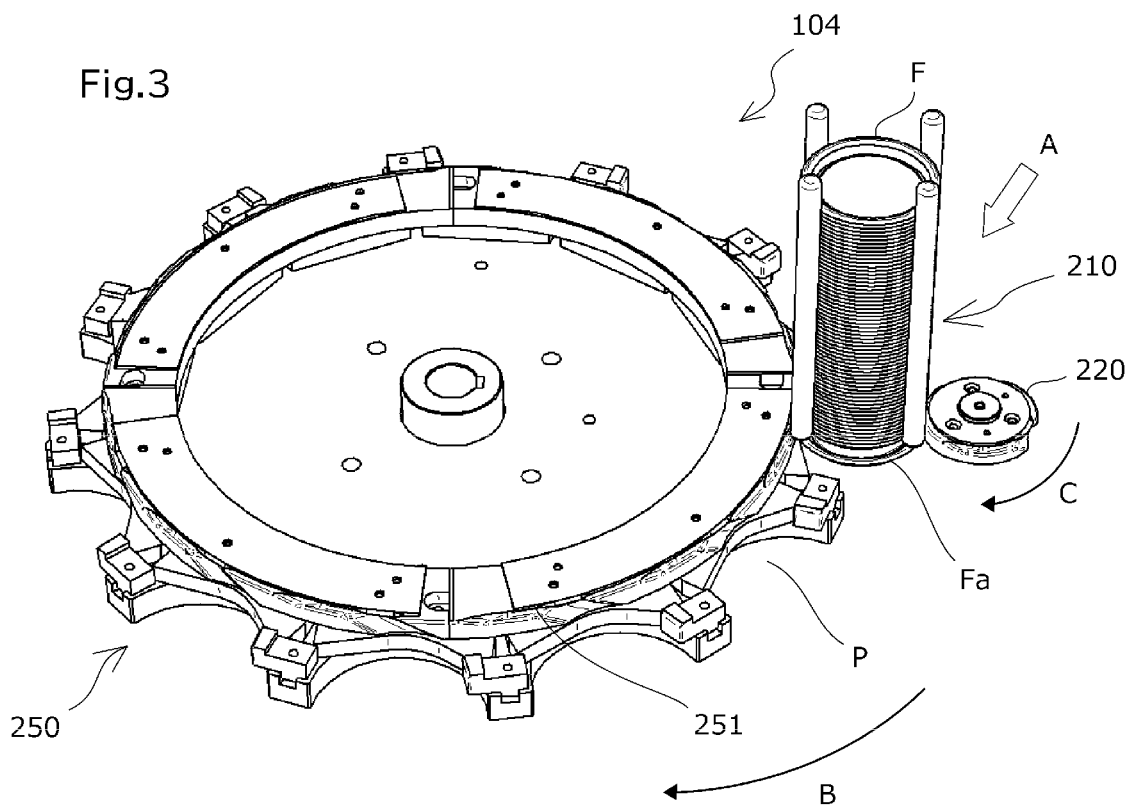
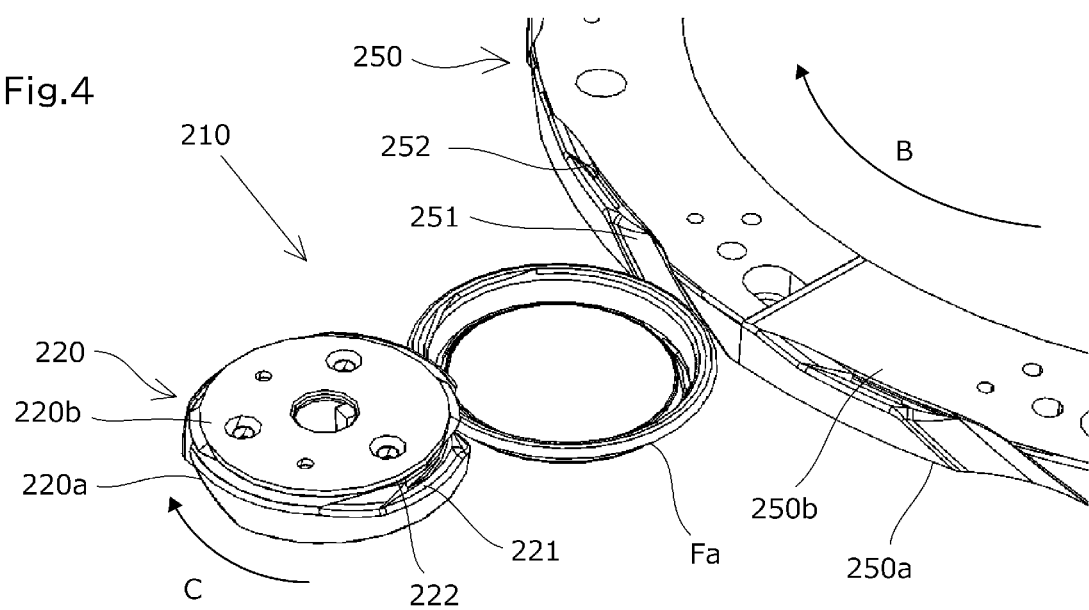

CONTAINER MEMBER SUPPLY DEVICE

TECHNICAL FIELD

The present invention relates to a container member supply device including a container member separation unit that supplies a container member having a flange at a peripheral edge thereof to a pocket of a container member conveyance turret, one by one.

BACKGROUND ART

A lid supply device provided in a seaming device that seams a lid to a can is cited as an example of a container member supply device that supplies a container member having a flange at a peripheral edge thereof to a pocket of a container member conveyance turret, one by one.

Conventionally, a seaming device is known, which includes a can mounting unit that mounts a can in which a beverage or the like is filled, a chuck unit that is provided facing the can mounting unit, and a seaming roll that seams a lid to a can.

As shown in, for example, Patent Literature 1, a known seaming device includes: a seaming turret (1) that performs a seaming process of seaming a can and a lid; a carrying-in conveyor (supply conveyor 7) that supplies, to the seaming turret, a can before seaming; a lid conveyance turret (supply turret 3) of a lid supply unit that supplies a lid; a discharge turret (discharge turret 5) that carries out, from the seaming turret, a can after seaming;

and a carrying-out conveyor (discharge conveyor 8) that carries out from the discharge turret to outside, a can.

Each of the seaming turret, the discharge turret, and the lid conveyance turret has, on an outer peripheral part thereof, pockets (fitting concave parts 2, 4, and 6) that separately accommodate and convey a can and a lid.

The respective pockets of the seaming turret have a can mounting unit (lifter 17) that mounts a can, a chuck unit (seaming chuck device 10) that is provided facing the can mounting unit, and seaming rolls (18 and 19) that seam a lid to a can.

In the seaming device thus configured, the speeds and timings of the respective turrets and the respective conveyors are adjusted by gears or the like, and the operations of the can mounting units, the chuck units, and the seaming units arranged for the pecks respectively are linked to the rotation of the seaming turret by gears, a cam mechanism, or the like. Thus, a can and a lid conveyed at a high speed can be continuously seamed while being transferred.

As a lid supply device of a seaming device, a three-screw type (three-lid cutout roll type) lid supply device has been conventionally used as shown in FIGS. 5 and 6. The three-screw type lid supply device has a configuration in which a plurality of lids F, F, ... are delivered downward in a state of being stacked inside a vertically extending path and separated one by one, with the lowermost end lid Fa engaging cutout grooves 521, 521, and 521 that are formed on the outer peripheries of three lid cutout rolls 520, 520, and 520 that are provided to rotate about a vertical rotating axis to separate the lids F, F, ... from each other at their lower end and that are provided at even intervals in a circumferential direction while cutout of the remaining lids F, F, ... is stopped by stoppers 522, 522, and 522, the three lid cutout rolls 520, 520, and 520 are simultaneously rotated about the vertical rotating axis via gears 525, 525, and 525 and an internal gear 526 that couples the gears 525, 525, 525 to each other, and the lowermost end lid Fa is delivered to a pocket of a lid conveyance turret 550 while maintaining its horizontal posture along the cutout grooves 521, 521, and 521 of the respective lid cutout rolls 520, 520, and 520 (see Patent Literature 2).

However, the above three-screw type lid supply device has a complicated structure due to the three lid cutout rolls or the like and is therefore costly. Further, the device is not favorable in workability since its total weight is heavy at a time of disassembling and washing the same.

Further, a one-screw type (one-lid cutout type) lid supply device has also been proposed as another lid supply device. As shown in FIGS. 7 and 8, the one-screw type lid supply device has a configuration in which lids F, F, ... are delivered downward in a state of being stacked inside an obliquely extending path, separated one by one, with the end edge of the lowermost end lid Fa engaging a cutout groove 621 of one lid cutout roll 620 provided to rotate about a vertical rotating axis to separate the lids F, F, ... from each other at their lower end while cutout of the remaining lids F, F, ... is stopped by a stopper 622, caused to change to a horizontal state from a state inclined by the cutout groove 621, and delivered to a pocket of a horizontal lid conveyance turret 650.

However, in the above one-screw type lid supply device, conveyance by the lid conveyance turret 650 starts with a curled part of the lowermost end lid Fa stacked. Therefore, a large pressing force due to the weight of the delivered lids F, F, ... stacked in a large amount is received by the curled part. Therefore, the lid Fa is damaged or abrasion powder is generated and mixed in a product, which is not preferable from the viewpoint of product quality or hygiene.

CITATION LIST

Patent Literature

[Patent Literature 1] Japanese Patent Application Laid-open No. S62-244537
[Patent Literature 2] Japanese Patent Application Laid-open No. H08-324795

SUMMARY OF INVENTION

Technical Problem

The present invention has been made in order to solve the above problems and has an object of providing a container member supply device that has favorable workability at a time of disassembly and washing and suppresses the occurrence of abrasion powder in a container member.

Solution to Problem

In order to solve the above problems, the present invention provides a container member supply device including:
a container member separation unit that supplies a container member having a flange at a peripheral edge thereof to a pocket of a container member conveyance turret, one by one, wherein
the container member separation unit has a plurality of cutout parts, and one of the plurality of cutout parts is constituted by a cutout groove that is integrally provided on an upper outer periphery of the container member conveyance turret and engages with a flange of a container member.

Advantageous Effects of Invention

According to the container member supply device of the present invention, at least one of a plurality of cutout parts is constituted by a cutout groove that is integrally provided on the upper outer periphery of a container member conveyance turret and engages with a container member. Thus, the container member supply device has no need to arrange a multiplicity of cutout rolls around a container member separation unit and can therefore have a more simplified structure over conventional art. Accordingly, the container member supply device can provide favorable workability at a time of disassembly and washing. Further, the container member supply device has a cutout groove on the side of the container member conveyance turret. Therefore, damage on the flange of a container member or the occurrence of abrasion powder in the container member when the container member is cut out can be suppressed compared with a one-screw type container member supply device.

In a configuration in which one of the cutout parts is a cutout groove that is provided on a cutout roll and engages with a lid according to the present invention, the one cutout roll may only be arranged besides the container member conveyance turret. Therefore, it is possible to simplify the structure.

In a configuration in which the downwardly delivered container member is mounted in a pocket of the container member conveyance turret while maintaining its substantially parallel posture according to the present invention, the lowermost end container member can be reliably separated and transferred to a pocket of the container member conveyance turret with its flange at the peripheral edge of the container member not stacked. Therefore, damage on the flange of the container member or the occurrence of abrasion powder in the container member can be further suppressed.

BRIEF DESCRIPTION OF DRAWINGS

FIG. 3 is a perspective view showing an example of the configuration of a lid supply device shown in FIG. 2.

FIG. 4 is a perspective view showing an example of a cutout groove and a lid cutout roll in the lid supply device shown in FIG. 3.

DESCRIPTION OF EMBODIMENTS

Hereinafter, the present invention will be described in detail.

A seaming device that seams a lid to a can is cited as an example of a device having a container member supply device (lid supply device) according to an embodiment of the present invention.

Figure 1:
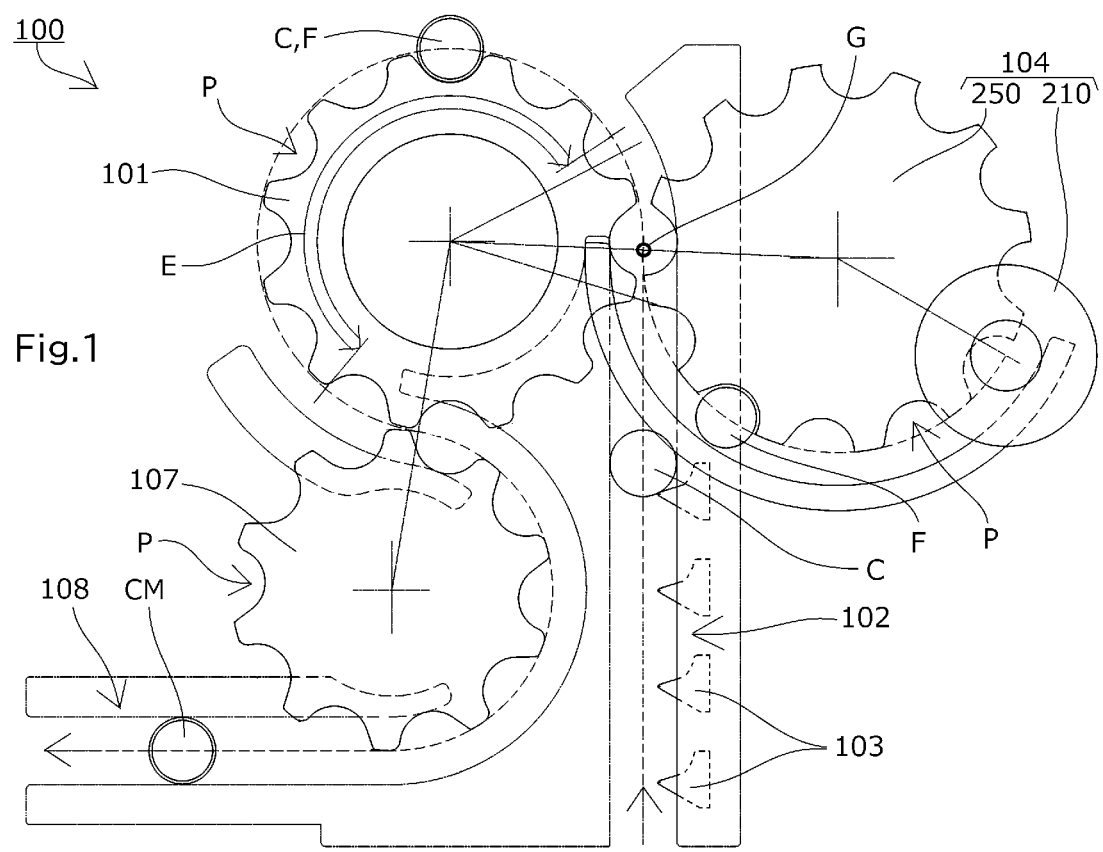
FIG. 1 is a schematic view showing an example of the configuration of a seaming device in which a container member supply device (lid supply device) according to an embodiment of the present invention is provided.

As shown in FIG. 1, a seaming device 100 includes: a seaming turret 101 that performs the seaming process of a can C and a lid F; a carrying-in conveyor 102 that supplies a can C before seaming to the seaming turret 101 in a non-rotated state; a lid supply device 104 that supplies a lid F and includes a lid separation unit (container member separation unit) 210 and a lid conveyance turret (container member conveyance turret) 250; a discharge turret 107 that carries out a can CM after seaming from the seaming turret 101; and a carrying-out conveyor 108 that carries out a can CM from the discharge turret 107 to an outside.

Each of the seaming turret 101, the discharge turret 107, and the lid conveyance turret 250 has pockets P that separately accommodate and convey cans C and CM and a lid F on their outer peripheral parts, and the carrying-in conveyor 102 has attachments 103 that separately engage and convey a can C.

The rotation speeds of the seaming turret 101, the discharge turret 107, and the lid conveyance turret 250, the movement speed of the attachments 103 of the carrying-in conveyor 102, and a timing at which the respective pockets P and the attachments 103 are linked to each other are adjustably designed so that cans C and CM and a lid F are smoothly transferred between the respective turrets and the conveyors.

Figure 2:
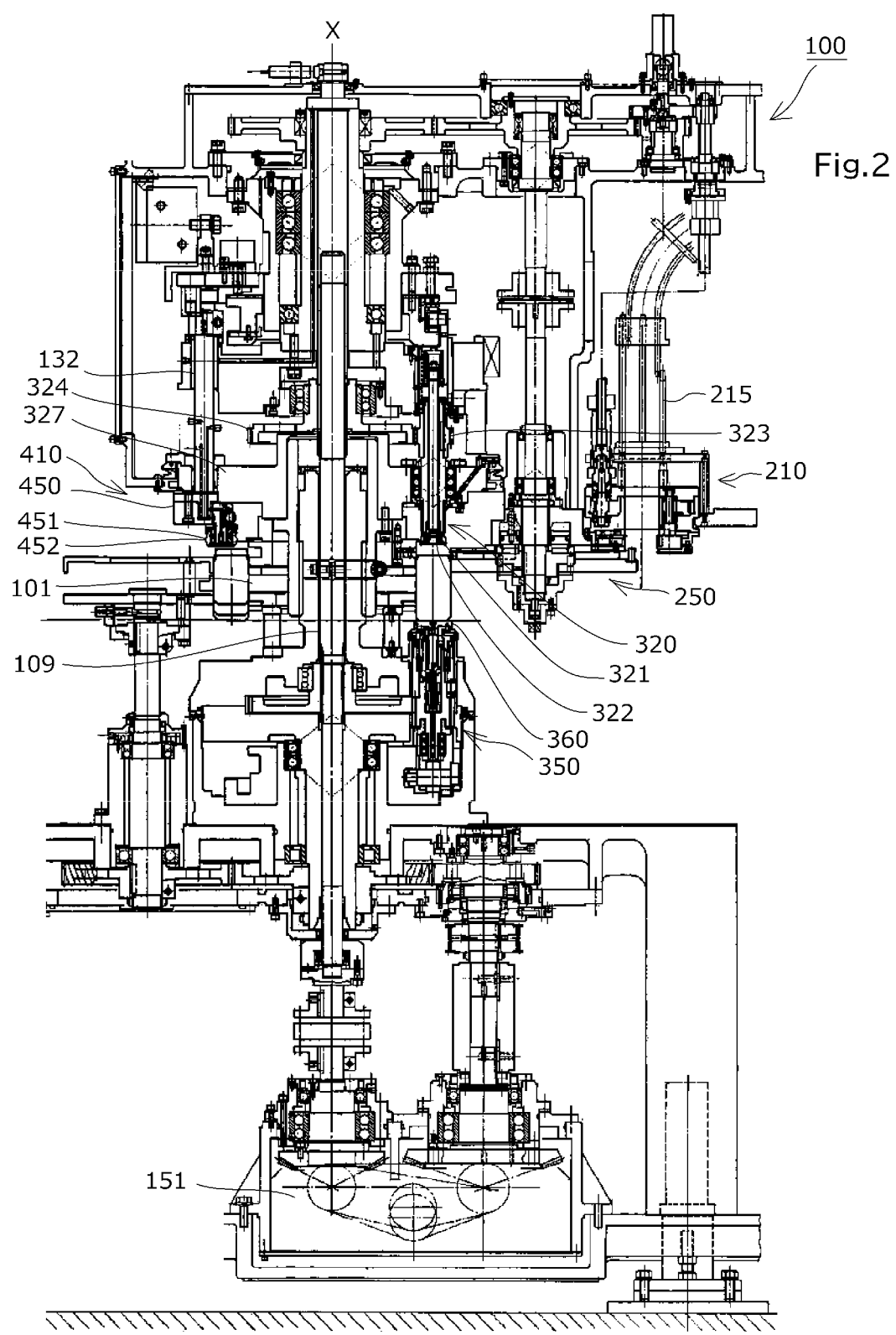
FIG. 2 is a cross-sectional view showing an example of the configuration of the seaming device in which the container member supply device (lid supply device) according to the embodiment of the present invention is provided.
Figure 5:
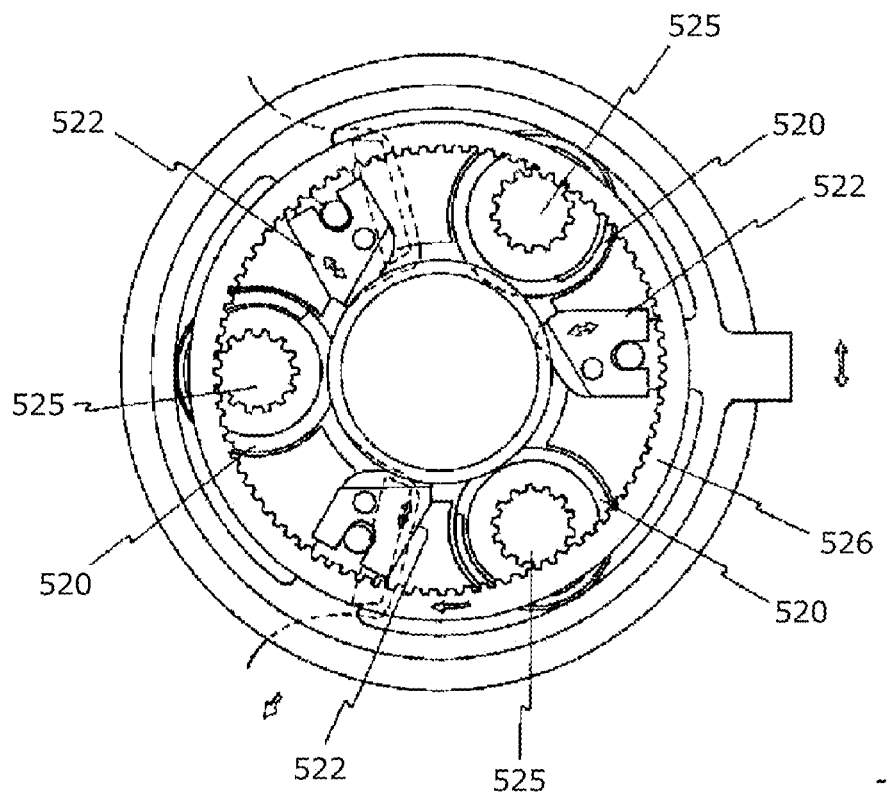
FIG. 5 is a plan view of a conventional three-screw type lid supply device.
Figure 6:
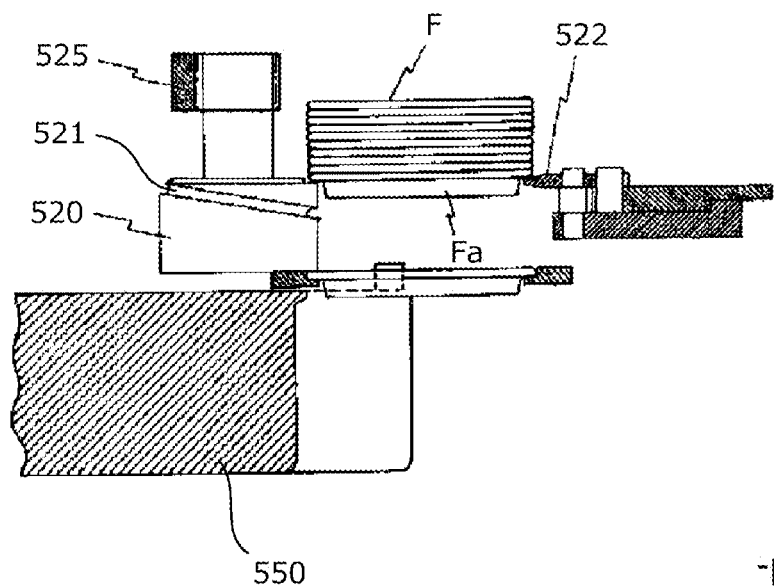
FIG. 6 is a front partially cross-sectional view of the lid supply device shown in FIG. 5.
Figure 7:
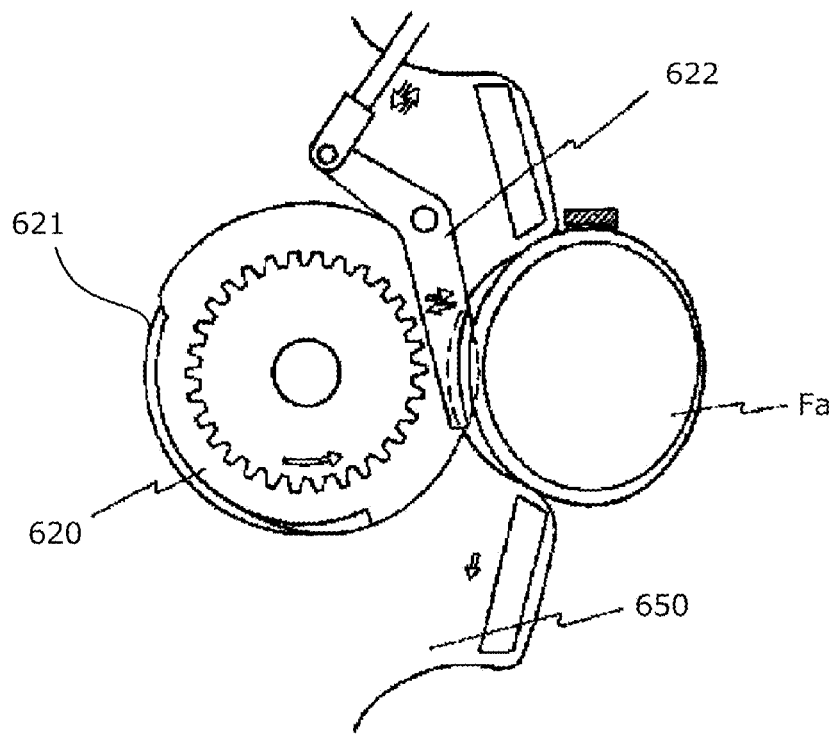
FIG. 7 is a plan view of a conventional one-screw type lid supply device.
Figure 8:
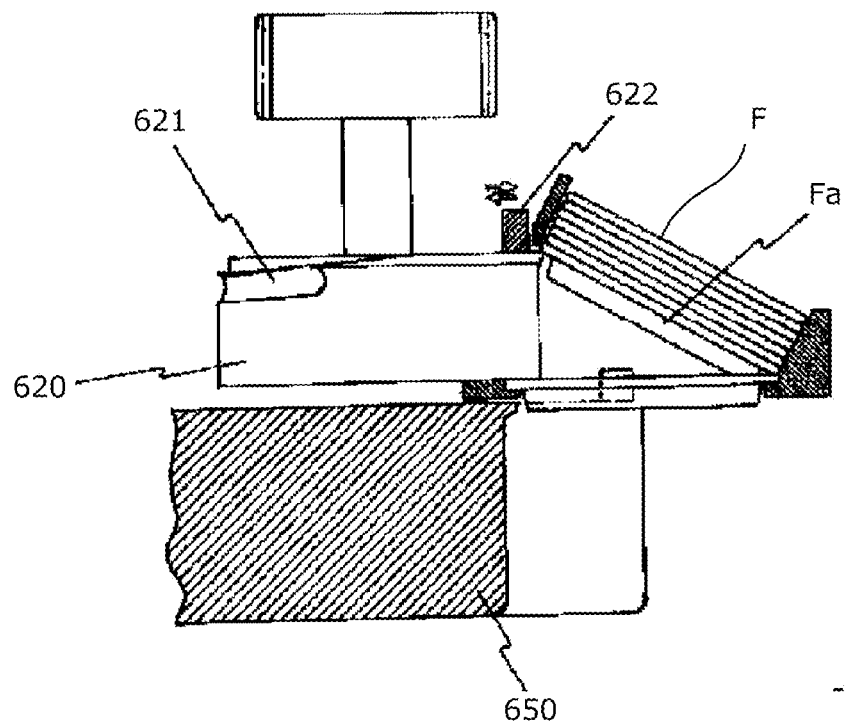
FIG. 8 is a front partially cross-sectional view of the lid supply device shown in FIG. 7.

As shown in FIG. 2, the seaming turret 101 that performs the seaming process of a can C and a lid F includes: a can mounting unit 350 that mounts a can C and rotates the same; a chuck unit 320 that is provided facing the can mounting unit 350 and has a chuck 321 that positions a lid F mounted on a can C and a knockout pad 322 that is fitted to be vertically movable inside the chuck 321 so as to press the lid F mounted on the can C; and a seaming unit 410 having seaming rolls 451 and 452 that seam a lid F to a can C in each of the pockets P.

The seaming turret 101 is arranged to be rotatable about the center shaft 109 with its central axis X extending in a vertical direction, and is rotationally driven by a driving mechanism 151 of the seaming turret 101.

The lid separation unit 210, the lid conveyance turret 250, and the carrying-in conveyor 102 are mechanically driven by the driving mechanism 151 of the seaming turret 101 via a transmission mechanism.

The chuck unit 320 is arranged to be rotatable about the center shaft 109 with its central axis X extending in a vertical direction and face the can mounting unit at an equal angular interval, and an outer surface gear 323 of a rotating shaft that supports the chuck 321 at its lower end engages a sun gear 324 supported by the center shaft 109. The chuck unit 320 revolves with the rotation of the center shaft 109 and a center column, and the chuck 321 rotates on its axis with the engagement between the sun gear 324 and the outer surface gear 323.

The chuck 321 is provided to be fixed and rotatable in a vertical direction. As shown on the right side of the central axis X in FIG. 2, the centering of a lid F is performed in such a manner that a can C on which the lid F has been mounted by lifting the can mounting unit 350 is fitted with the lower end outer peripheral surface of the chuck 321 while being sandwiched between the knockout pad 322 and the can mounting unit 350.

The seaming unit 410 performs double seaming with seaming rolls 451 and 452 each pivotally fitted to both ends of a seaming lever 450 so as to rotate, the seaming lever 450 having its central part fixed to the lower end of a revolving roll swinging shaft 132.

In a double seaming process, a curled portion of a lid F is wrapped into a flange portion of a can C by the seaming roll 451 in primary seaming, and then crimping and bonding are performed by the fastening of seaming roll 452 to maintain sealing in secondary seaming.

As shown in FIG. 3, a lid supply device 104 has a lid separation unit (container member separation unit) 210 that cuts out a plurality of lids F, F, . . . stacked in a vertical direction by a substantially vertically extending path 215 (see FIG. 2) one by one, and a lid conveyance turret 250 having pockets P that convey the cut-out lids F onto cans C.

The lid conveyance turret 250 is rotated in a clockwise direction (a direction indicated by arrow B in FIG. 3) when seen from above.

As shown in FIG. 4, the lid separation unit 210 has two cutout parts. Note that FIG. 4 is a perspective view when seen from a direction indicated by arrow A in FIG. 3. In order to facilitate the understanding of the configuration of the lid supply device 104, FIG. 4 omits a path 215 or the like and shows only the lowermost end lid Fa as for the lids F, F, . . . .

One of the cutout parts is constituted by a cutout groove 251 that is integrally formed on the upper outer periphery of the lid conveyance turret 250, spirally extends along the track of the end edge of the lowermost end lid Fa, and engages the end edge of the lowermost end lid Fa. The lower end of the cutout groove 251 corresponds to the position of a pocket P of the lid conveyance turret 250. At the upper end of the cutout groove 251, a separator knife 252 for separating the lowermost end lid Fa from the lid F stacked right above the lowermost end lid Fa and guiding only the lowermost end lid Fa to the inside of the cutout groove 251 is provided. The separator knife 252 may be constituted by a protruding part of the upper end wall of the cutout groove 251, or may be constituted by a peripheral edge of a plate 250b provided by screwing or the like on a body 250a of the lid conveyance turret 250 having the cutout groove 251 as shown in FIGS. 3 and 4.

The numbers of the provided cutout grooves 251 and the separator knives 252 correspond to the number (12 in FIG. 1) of the pockets P of the lid conveyance turret 250.

The other of the cutout parts is provided on a lid cutout roll 220 that rotates about a substantially vertically extending rotating axis at the lower end of the lids F, F, . . . stacked inside the path 215.

The lid cutout roll 220 is rotated in a clockwise direction (a direction indicated by arrow C in FIG. 3) when seen from above. The rotating speed is preferably set so that the outer peripheral speed of the lid cutout roll 220 is close to or the same as the outer peripheral speed of the lid conveyance turret 250.

The lid cutout roll 220 has, on its outer periphery, a cutout groove 221 that spirally extends along the track of the end edge of the lowermost end lid Fa fed so as to draw an arc and engages the end edge of the lowermost end lid Fa. The other of the cutout parts is constituted by the cutout groove 221. At the upper end of the cutout groove 221, a separator knife 222 for separating the lowermost end lid Fa from the lid F stacked right above the lowermost end lid Fa and guiding only the lowermost end lid Fa to the cutout groove 221 is provided. The separator knife 222 may be constituted by a protruding part of the upper end wall of the cutout groove 221, or may be constituted by a peripheral edge of a plate 220b provided by screwing or the like on a roll body 220a of the lid cutout roll 220 having the cutout groove 221 as shown in FIGS. 3 and 4. The separator knife 222 is arranged at the same height (on a horizontal surface) as the separator knife 252 of the lid conveyance turret 250.

The spiral inclination angles or lengths of the cutout grooves 221 and 251 constituting the respective cutout parts are equivalent to each other. The lengths of the cutout grooves 221 and 251 are lengths based on an interval at which the lids F are conveyed, that is, an interval between the pockets P.

Note that the number of the cutout parts is not limited to two but may be three or more. For example, when the number of the cutout parts is three, the lids F can be cut out by the respective cutout grooves 221 of two lid cutout rolls 220 and the cutout groove 251 of one lid conveyance turret 250.

Further, in the lid cutout roll 220 shown in FIGS. 3 and 4, two cutout grooves 221 are provided for one lid cutout roll 220 but one or three or more cutout grooves may be provided.

The basic operation of the seaming device 100 thus configured will be described.

A can C to which a lid F has been seamed is conveyed while engaging each of the attachments 103 of the carrying-in conveyor 102 and directed to the seaming turret 101 rotated by the driving mechanism 151 of the seaming turret 101.

On the other hand, the lid F is cut out one by one from the lid separation unit 210, transferred to each of the pockets P of the lid conveyance turret 250, and directed to the seaming turret 101 by the rotation of the lid conveyance turret 250 (see FIG. 1).

The speeds and timings of the carrying-in conveyor 102 and the lid conveyance turret 250 are adjusted according to the speed and timing of the seaming turret 101 so that the centers of the can C and the lid F are aligned with each other at a merging point G. When the can mounting unit 350 of which the rotation is controlled via appropriate gears, a cam mechanism, or the like by the driving mechanism 151 to which power has been applied from a driving source not shown is lifted at the merging point G, the lid F is mounted on the can C mounted on the plate 360.

After that, the can mounting unit 350 is further lifted, the knockout pad 322 inside the chuck 321 presses the lid F, and the chuck 321 of which the rotation is controlled via appropriate gears, a cam mechanism, or the like by the driving mechanism 151 is fitted into the lid F to perform the centering of the lid F. The can C on which the lid F has been mounted is sandwiched between the plate 360, the chuck 321, and the knockout pad 322 at a constant axial load necessary for seaming.

Then, the seaming turret 101 further rotates, and the plate 360 and the chuck 321 accelerate up to their rotation numbers necessary for seaming before the sandwiched lid F and the can C reach a seaming interval E shown in FIG. 1.

While passing through the seaming interval E, the seaming lever 450 fixed to the lower end of the roll swinging shaft 132 of the seaming unit 410 is swung. Thus, two seaming rolls 451 and 452 for primary and secondary seaming each pivotally fitted to both ends so as to rotate are sequentially pressed against the can C and the flange of the lid F mounted on the can C from their lateral sides toward the chuck 321 to perform double seaming.

The can CM having completed the seaming is transferred from the seaming turret 101 to the discharge turret 107 and then transferred from the discharge turret 107 to the carrying-out conveyor 108 to be carried out to a next process such as inspection and packaging.

In the lid supply device 104, the rotating power of the lid conveyance turret 250 and the lid cutout roll 220 may be transmitted where necessary via a known power transmission mechanism or the like such as an appropriate gear, a belt, a chain, and a cam from the driving mechanism 151 of the seaming turret 101 to control rotation, or may be transmitted by a driving source different from a driving source that applies power to the driving mechanism 151 to control the rotation.

The basic operation of the lid supply device 104 is as follows. As shown in FIG. 4, among the lids F, F, . . . stacked in the vertical direction in a substantially horizontal posture by the substantially vertically extending path 215, one end edge of the lowermost end lid Fa engages the separator knife 252 of the cutout groove 251 of the lid conveyance turret 250, and the other end edge of the lowermost end lid Fa on the side opposite to the one end edge engages the separator knife 222 of the cutout groove 221 of the lid cutout roll 220 along with the rotation of the lid conveyance turret 250 in a direction indicated by arrow B and the rotation of the lid cutout roll 220 in a direction indicated by arrow C, and the lid conveyance turret 250 and the lid cutout roll 220 are rotationally driven in synchronization with each other. Thus, the lid Fa is guided to the cutout groove 251 of the lid conveyance turret 250 and the cutout groove 221 of the lid cutout roll 220, while the cutout of the lids F, F, . . . other than the lowermost end lid Fa is stopped by the separator knives 222 and 252. The lid Fa having been guided by the cutout grooves 251 and 221 is drawn back to a pocket P of the lid conveyance turret 250 and delivered with its substantially horizontal posture maintained along the cutout grooves 251 and 221. As described above, the lids F in a stacked state are sequentially supplied to the pockets P of the lid conveyance turret 250 one by one in an order from the lowermost end lid Fa.

The lid supply device 104 as described above has no need to arrange a multiplicity of lid cutout rolls around the lid separation unit 210 and can therefore have a more simplified structure over conventional art. Accordingly, the lid supply device 104 can provide favorable workability such as easy disassembly of the lid supply device 104 at washing and the possibility of washing the lid supply device 104 without being disassembled. Further, when only the one lid cutout roll 220 is arranged besides the lid conveyance turret 250, the structure can be simplified and the manufacturing costs can be reduced. Further, the cutout groove 251 is provided on the side of the lid conveyance turret 250, and the lid Fa delivered downward is drawn back to a pocket P of the lid conveyance turret 250 and mounted while maintaining its posture substantially parallel to the stacked lids F, F, . . . . Therefore, even when the one lid cutout roll 220 or a small number of the lid cutout rolls 220 are provided, damage on the flange of a lid F or the occurrence of abrasion powder in the lid F when the lid F is cut out can be suppressed compared with a one-screw type lid supply device.

The embodiment of the present invention is described in detail above. However, the present invention is not limited to the above embodiment and enables various design changes without departing from the present invention described in claims. For example, the container member is not limited to a lid F seamed to a can C but may only be a container member having a flange at its peripheral edge. Examples of the container member having the flange at its peripheral edge can include a cup-shaped container having a curled part at its peripheral edge. In this case, the cup-shaped container is guided to a pocket of the container member conveyance turret with the curled part of the peripheral edge maintaining its substantially horizontal posture.

Further, the material of the container member is not limited to metal but may be plastic, paper, wood, or the like.

REFERENCE SIGNS LIST

100 Seaming device
101 Seaming turret
102 Carrying-in conveyor
103 Attachment
104 Lid supply device
107 Discharge turret
108 Carrying-out conveyor
109 Center shaft
132 Roll swinging shaft
151 Driving mechanism
210 Lid separation unit
215 Path
220 Lid cutout roll
220a Roll body
220b Plate
221 Cutout groove
222 Separator knife
250 Lid conveyance turret
250a Body
250b Plate
251 Cutout groove
252 Separator knife
320 Chuck unit
321 Chuck
322 Knockout pad
323 Outer surface gear
324 Sun gear
350 Can mounting unit
360 Plate
410 Seaming unit
450 Seaming lever
451 Seaming roll (primary seaming)
452 Seaming roll (secondary seaming)
520 Lid cutout roll
521 Cutout groove
522 Stopper
525 Gear
526 Internal gear
550 Lid conveyance turret
620 Lid cutout roll
621 Cutout groove
622 Stopper
650 Lid conveyance turret
C Can (before seaming)
F, Fa Lid
CM Can (after seaming)
P Pocket
E Seaming interval
X Central axis

The invention claimed is:

1. A container member supply device comprising:
a container member conveyance turret having a plurality of pockets;
a container member separation unit comprising a container member holder configured to hold a plurality of container members in a vertically stacked state;
wherein the container member separation unit is configured to supply the plurality of container members downward to the plurality of pockets one by one;
wherein a cutout groove is integrally provided on an upper outer periphery of the container member conveyance turret and is configured to cut out a bottom one of the container members from another one of the container members one by one.

2. The container member supply device according to claim 1, wherein the container member separation unit further comprises a cutout roll, and a cutout groove is provided on an outer periphery of the cutout roll and is configured to engage with a flange of the container members.

3. The container member supply device according to claim 1, wherein the container member separation unit is configured to deliver each of the container members in a substantially horizontal posture into a respective one of the plurality of pockets while maintaining each of the container members in a substantially horizontal posture.

4. The container member supply device according to claim 1, wherein the plurality of container members are lids to be seamed to a can.

\* \* \* \* \*